(12) United States Patent
Spahn

(10) Patent No.: US 7,676,076 B2
(45) Date of Patent: Mar. 9, 2010

(54) NEURAL NETWORK BASED METHOD FOR DISPLAYING AN EXAMINATION IMAGE WITH NORMALIZED GRAYSCALE VALUES

(75) Inventor: Martin Spahn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1043 days.

(21) Appl. No.: 11/365,984

(22) Filed: Mar. 1, 2006

(65) Prior Publication Data

US 2006/0198552 A1 Sep. 7, 2006

(30) Foreign Application Priority Data

Mar. 4, 2005 (DE) ...................... 10 2005 010 076

(51) Int. Cl.
- *G06K 9/00* (2006.01)
- *G06K 9/62* (2006.01)
- *G06K 9/34* (2006.01)
- *G06T 1/40* (2006.01)
- *A61B 5/05* (2006.01)

(52) U.S. Cl. ...................... 382/132; 382/156; 382/169; 382/173; 706/15; 128/925; 600/408

(58) Field of Classification Search ................ 382/128, 382/132, 155–160, 173–180, 224–228, 130, 382/168, 169, 274; 706/6, 15, 20, 22, 924; 128/920, 922, 924, 925; 600/408; 700/48; 348/28; 250/370.09; 378/901, 98

See application file for complete search history.

(56) References Cited

U.S. PATENT DOCUMENTS 5,003,490 A * 3/1991 Castelaz et al. ............... 706/22
5,052,043 A * 9/1991 Gaborski ..................... 382/157
5,164,993 A * 11/1992 Capozzi et al. .............. 382/132
5,247,303 A * 9/1993 Cornelius et al. ......... 342/26 D
5,268,967 A * 12/1993 Jang et al. ................... 382/132
5,351,306 A * 9/1994 Finkler et al. ............... 382/169
5,426,684 A * 6/1995 Gaborski et al. .............. 378/62
5,515,450 A * 5/1996 Takeo et al. ................. 382/132
5,574,212 A * 11/1996 Madsen et al. ............... 73/1.82
5,710,830 A * 1/1998 Holeva ....................... 382/173
5,751,850 A * 5/1998 Rindtorff .................... 382/178
5,758,027 A * 5/1998 Meyers et al. ................. 706/26

(Continued)

FOREIGN PATENT DOCUMENTS

DE 41 29 656 A1 3/1993

OTHER PUBLICATIONS

Kegelmeyer et al. (Sep. 2007) "Local area signal-to-noise ratio (LASNR) algorithm for image segmentation." Proc. SPIE vol. 6696, 66962H.*

(Continued)

*Primary Examiner*—Bhavesh M Mehta
*Assistant Examiner*—Barry Drennan

(57) ABSTRACT

Image processing method for a digital medical examination image, the pixels of which are assigned a gray-scale value in each instance, with a minimum and a maximum gray-scale value being defined as limit values for the purpose of displaying the examination image, with the pixels being subjected to an evaluation by means of a neural network, in order to determine such pixels and to disregard them when defining the gray-scale values which are located in a direct radiation region or in a projected collimator region.

8 Claims, 2 Drawing Sheets

U.S. PATENT DOCUMENTS

| | | | | |
|---|---|---|---|---|
| 6,341,172 | B1* | 1/2002 | Xu et al. | 382/132 |
| 6,731,823 | B1* | 5/2004 | Gallagher et al. | 382/266 |
| 6,775,399 | B1* | 8/2004 | Jiang | 382/128 |
| 7,391,848 | B2* | 6/2008 | Spahn | 378/98 |
| 2002/0186875 | A1* | 12/2002 | Burmer et al. | 382/133 |
| 2003/0161519 | A1* | 8/2003 | Vuylsteke | 382/128 |

OTHER PUBLICATIONS

Pratt, W.K. (Dec. 2001) "Digital image processing: PIKS Inside." 3$^{rd}$ Ed., Wiley, pp. 243-261.*

M. Spahn, V. Heer, R. Freytag, "Flachbilddetektoren in der Röntgendiagnostik", Der Radiologe 5, Digitale Röntgenaufnahmen, 2003, pp. 340-350, vol. 43.

Shaun W. Lawson and Graham A. Parker, "Intelligent Segmentation of Industrial Radiographic Images Using Neural Networks", Proc. Of SPIE Machine Vision Applications, Architectures and Systems Integration III, 1994, pp. 245-255, vol. 2347.

* cited by examiner

NEURAL NETWORK BASED METHOD FOR DISPLAYING AN EXAMINATION IMAGE WITH NORMALIZED GRAYSCALE VALUES

CROSS REFERENCE TO RELATED APPLICATIONS

This application claims priority to the German Application No. 10 2005 010 076.7, filed Mar. 4, 2005 which is incorporated by reference herein in its entirety.

FIELD OF INVENTION

The invention relates to an image processing method for a digital medical examination image, the pixels of which are assigned a gray-scale value in each instance, with a minimum and maximum gray-scale value being defined as limit values for the purpose of displaying the examination image.

BACKGROUND OF INVENTION

Digital medical examination images which require computed image processing are generated by medical examination methods such as computer tomography, magnetic resonance, ultrasound, methods of nuclear medicine for example, and also increasingly by digital x-ray methods. For this purpose, these complex method steps serve to optimally display the information content of the examination images which is significant for the diagnosis. There is thus a demand for automatic methods which ensure that the examination image or an image series is optimally displayed without further user intervention. A central problem with the image display is the definition of the minimum and the maximum gray-scale value of the pixels. The average level (level) and the contrast (window) can also be defined instead of the extreme values. However, the definition of the gray-scale values and/or the definition of the level and window are critical. Image information is lost if the window is selected too narrow, or the level is not optimal, and if the window is selected too wide the contrast of the examination image is too low and the details are thus more difficult to recognize.

SUMMARY OF INVENTION

With conventional image processing methods, the values for the window or the minimum and maximum gray-scale values are either permanently predetermined, for example in an organ-dependent manner for a specific dose level in the case of an x-ray examination, or the sought parameters are automatically defined on the basis of the gray-scale values of the image pixels. In the simplest case, the minimum and the maximum gray-scale value of the examination image are defined and used for the image display. This known method nevertheless comprises a series of disadvantages. If the examination image contains direct radiation regions, the highest gray-scale values of the dynamic regions are thereby normally occupied. On the other hand if the projected collimators of an x-ray system are mapped for instance in the examination image, the lowest gray-scale values of the dynamic region are thus occupied. If, in the simplest case, only the minimum and maximum of the gray-scale values of the histogram are used to define the window, an excessively large window and an incorrect average level result, so that the image information actually required for diagnosis, which shows the examined organ in detail, is only suboptimally displayed.

An object underlying the invention is to specify an image processing method for a digital medical examination image, by means of which the minimum and the maximum grayscale value are automatically selected, thereby rendering the image display optimal.

To solve this problem, provision is made according to the invention in the case of an image processing method of the type mentioned at the start for the pixels to be subjected to an evaluation by means of a neural network, in order to determine such pixels and to allow them to be disregarded when the gray-scale values, which are located in a direct radiation region or in a projected collimator region, are defined.

The idea underlying the invention is that image regions can be determined by means of a neural network, said image regions belonging to a specific category, since their pixels exhibit similar gray-scale values. It is thereby possible to determine direct radiation regions or collimator regions. Direct radiation regions feature very high gray-scale values; collimator regions, on the other hand, feature very low gray-scale values. These regions with extreme gray-scale values are discounted when the gray-scale values are defined, so that limit values of the gray-scale values relevant for the image display only relate to such pixels which display the examined organ. The image processing method according to the invention can be automatically carried out so that the displayed examination images are not influenced by the subjectively selected settings by a user.

Within the scope of the image processing method according to the invention, provision can be made for the signal value of a pixel to be used as a value for input nodes of the neural network. Alternatively or in addition, the signal-to-noise ratio of a pixel determined taking into account adjacent pixels can be used as a value for the input nodes of the neural network. Statistical values such as the variance or the standard deviation can be determined for the surroundings of a pixel. The data acquired in this way are input variables for the neural network.

As a further alternative, provision can be made with the image processing method according to the invention in that an organ displayed on the examination image and/or the dose region selected with an x-ray examination and/or the x-ray voltage selected with an x-ray examination is/are used as a value for the input nodes of the neural network. It is also possible for the gradient of the signal value of a pixel determined taking into account adjacent pixels is used as a value for the input nodes of the neural network. The gradient of the signal values in the surroundings of a specific pixel supplies information about the "flatness" of the signals, with only very slight changes to the signal level from pixel to pixel being present in the direct radiation region and in the projected collimator region. However, larger gradients are usually present between adjacent pixels in the region of the displayed object.

In a further embodiment of the method according to the invention, provision can be made in that the neural network determines the probability which specifies whether a specific pixel lies in the direct radiation region, in the region of the object or in the region of the collimator. For this purpose, the neural network is trained with sample images, so that the output nodes subsequently produce the corresponding probability values.

With the image processing method according to the invention, provision can be made whereby examination image regions with similar or identical image information are determined on the basis of the determined probability values. From experience, the image regions with direct radiation and the image regions with projected collimators are simply connected regions. These regions can thus be determined on the basis of the probability values. In a further embodiment of the invention provision can thus be made for a region determined in this manner to be defined provided a specific minimum number of pixels with similar or identical image information is available. In the next method step, these regions with direct radiation or with projected collimator radiation can be disregarded so that for the purpose of defining the minimum and maximum gray-scale values, those image regions which show the object can be used.

The invention also relates to a medical examination device, in particular an x-ray system for recording digital medical examination images.

According to the invention the medical examination device is designed to implement the described image processing method.

BRIEF DESCRIPTION OF THE DRAWINGS

Further advantages and details of the invention are described on the basis of an exemplary embodiment with reference to the figures. The figures are schematic representations in which.

DETAILED DESCRIPTION OF INVENTION

Figure 1:
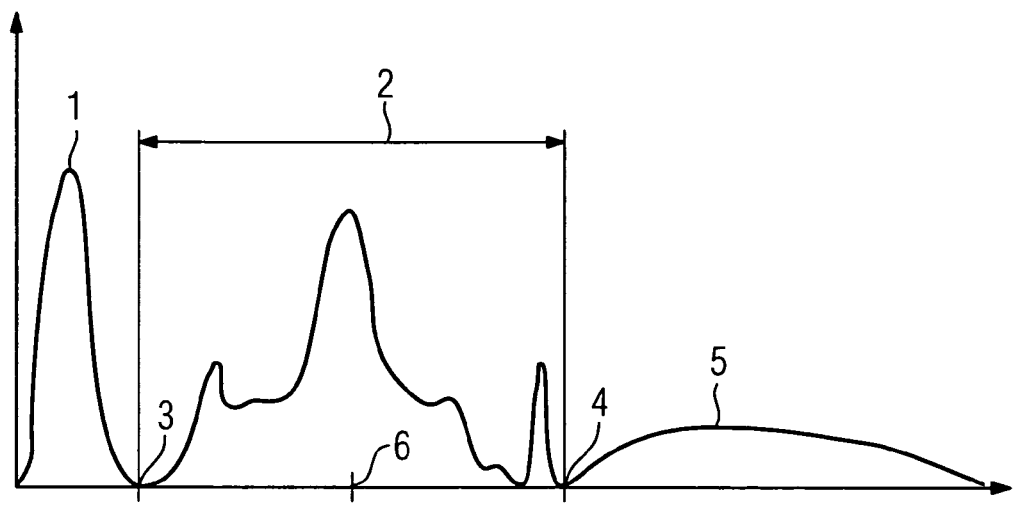
FIG. 1 shows a histogram with a gray-scale value distribution of an x-ray recording.

FIG. 1 shows the gray-scale value distribution of an x-ray recording in the form of a histogram. The gray-scale values are plotted on the horizontal axis, and the number of pixels is plotted on the vertical axis; FIG. 1 accordingly shows the distribution of the gray-scale values. The region 1 contains the gray-scale values in the projected collimator region, which are very low. A window 2 is connected thereto, which is restricted by a minimum 3 and a maximum 4. Direct radiation is present in the region 5, the gray-scale values accordingly being very high there. To achieve an optimum display of the medical examination image, the region of the window 2 between the minimum 3 and maximum 4 must be determined. The region of the window 2 can also be defined by an average value 6 and by specifying window width. The position of the window is determined by the image processing method.

Figure 2:
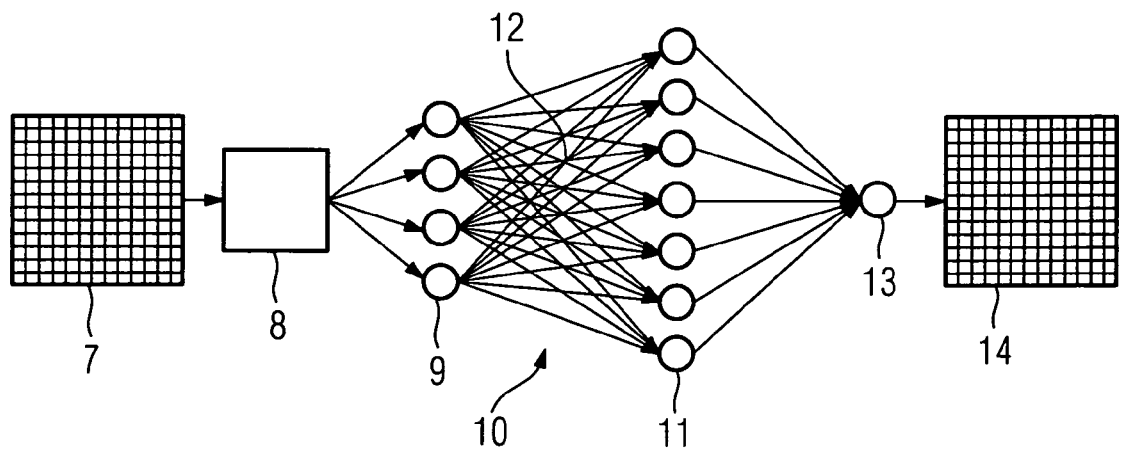
FIG. 2 shows the processing of the image information by a neural network within the scope of the method according to the invention.

FIG. 2 shows the processing of the image information by a neural network. With an x-ray examination in which a flat panel detector is used a gray-scale value is obtained for each pixel of the detector. Together, all pixel values form an image matrix 7, which is subjected to preprocessing 8 in the next method step.

Within the scope of the preprocessing 8, the image matrix 7 is analyzed pixel by pixel. Using the method step of preprocessing 8, values are determined for input nodes 9 of a neural network 10. In the simplest case, the signal values of the pixels can be used as values for the input nodes 9. Since the gray-scale values in the projected collimator region are very low and the gray-scale values in the region of the direct radiation are very high, an evaluation can take place already as a result of these simple specifications. Alternatively or in addition, the signal-to-noise ratio of the pixels can be taken into account. For this purpose, the pixels are evaluated in the surroundings of a pixel, in order to determine the variance and the standard deviation of the gray-scale values. In the simplest case, the direct 3×3 surroundings of a pixel can be evaluated. In the region of the direction radiation, the local x-ray spectrum is not damped or filtered so that the signal-to-noise ratio is at its greatest at this location and is defined by the "softest" possible x-ray spectrum. On the other hand, the signal-to-noise ratio in the region of the projected collimator region is at its lowest through the lead plates and the x-ray spectrum is maximally filtered, the "hardest" possible spectrum accordingly being present here. The selected definitions "soft" and "hard" relate to the output spectrum selected for a given organ.

Alternatively or in addition, the gradient of the signals in the surroundings of a pixel can also be taken into consideration. A surrounding of 3×3, 5×5 pixels or larger surroundings can also be selected here. Since only very minor changes to the signal level from pixel to pixel are present in the direct radiation area and also in the projected collimator region, the gradient of the signals is a characteristic variable in order to determine in which area a specific pixel is located. In addition, further parameters can be taken into consideration, including the selected examined organ, the selected dose region or the selected x-ray voltage.

Besides the input nodes 9, the neural network 10 features a hidden layer 11, with the input nodes 9 and the nodes of the hidden layer 11 being coupled via connections 12. The hidden layer 11 is connected to an output node 13, which produces the probability determined by the neural network 10 for a specific pixel. The probability distribution for the complete examination image is subsequently present in the form of a probability matrix 14. The neural network 10 must be trained first in a known manner, with corresponding examination images being used, in which the different regions (direct radiation, collimator, object) have been defined by a user.

In the exemplary embodiment displayed, the probabilities from 0 to 0.1 are assigned to the collimator region, the probabilities between 0.1 to 0.9 are assigned to the object region and the probabilities between 0.9 and 1 are assigned to the direction radiation region. The ideal value for the collimator region is 0, the ideal value for the direct radiation region is 1.

Based on an individual pixel, in the next method step the surrounding region is expanded by a pixel by pixel connection of adjacent pixels with the same or similar image information. For this purpose, morphological filters can also be used, with use being made of the fact that direct radiation regions and image regions of projected collimators are simply connected areas in a mathematic sense. Based on a pixel which has a very high probability of belonging to the category direct radiation (p=1), further pixels belonging to this category and thus bearing similar probability values are now sought in the direct neighborhood. Since the areas are connected and do not feature any islands, individual enclosed pixels which have rather deviating probabilities can be thus accepted and extend the area. To ensure that an area actually belongs to the direction radiation category, a specific defined number of directly connected pixels are required to be present. If the pixels of the area lying in the peripheral area consistently feature probability values deviating from the expected value (p=1), this is evaluated as a stop criterion. The same applies analogously for image regions of the projected collimator, in which the expected value for the probability is p=0. Within the scope of the method, a number of areas are found in this manner, in which either direct radiation is present or projected collimator regions are present.

Figure 3:
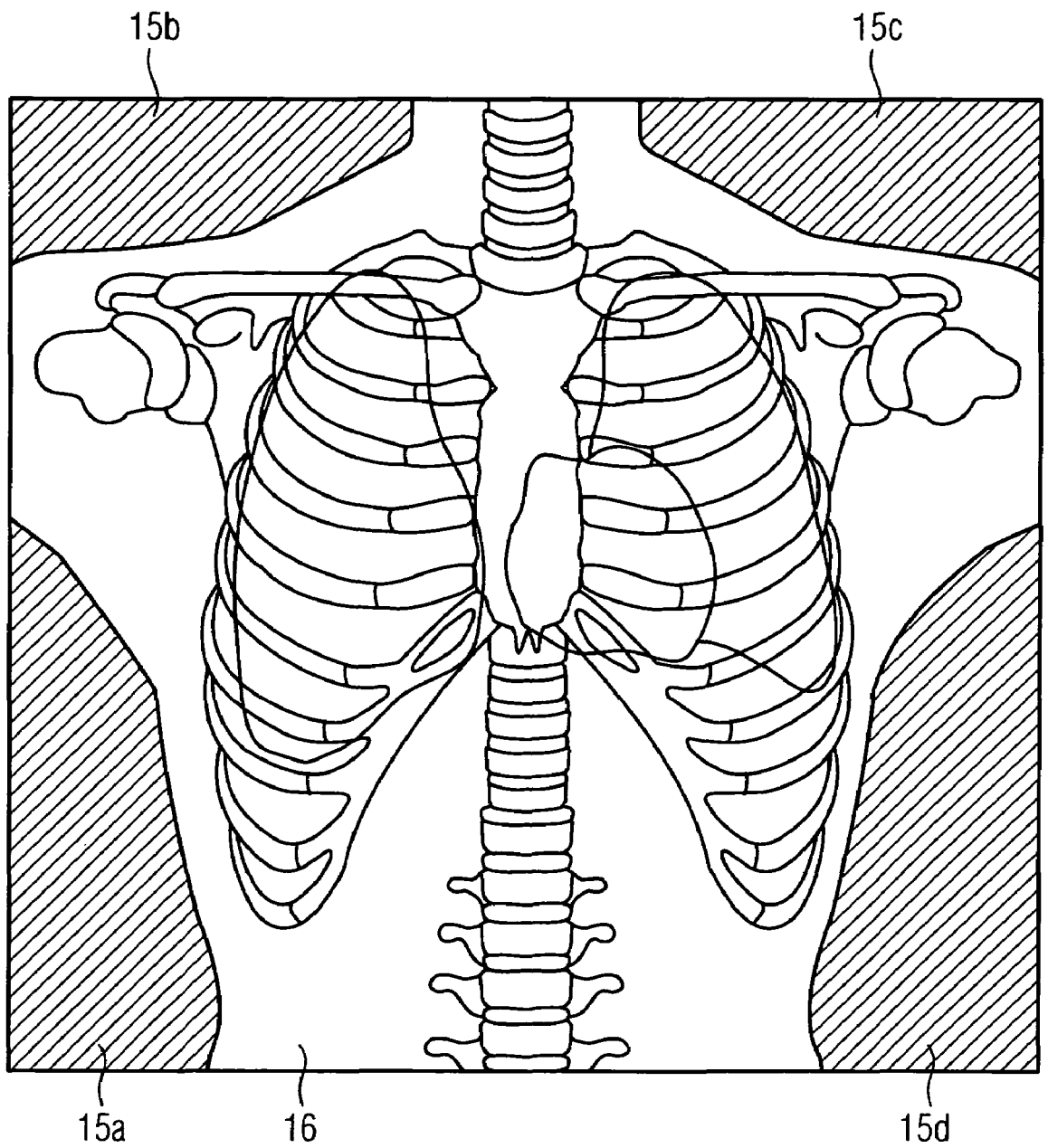
FIG. 3 shows a radiography recording with determined direct radiation regions

FIG. 3 shows an example of a radiography recording of the thorax with a number of direct radiation regions.

The regions 15a to 15d were determined by the image processing method implemented in an x-ray system, in which regions direct radiation strikes the detector during the examination. When the limit values are defined for the gray-scale values, the direct radiation regions 15a to 15d are not taken into consideration so that only the remaining region 16 is used to define the window and the minimum and maximum gray-scale value.

The invention claimed is:

1. A method of processing a digital medical examination image based on image information recorded with a flat panel detector, with the recorded image information characterized by first gray-scale values and with the examination image including pixels having assigned second gray-scale values, wherein for the second gray scale values a minimum gray-scale value and a maximum gray-scale value are determined as limit values for displaying the examination image, the method comprising:

generating the recorded x-ray image information with the flat panel detector by transmitting a first portion of a dose of energy through a collimator for recording collimator region information of the image, by transmitting another portion of the dose through a body part for recording body part information of the image, and by transmitting still another portion of the dose to record direct radiation information of the image, prior to recording the x-ray image information with the flat panel detector, training a neural network with sample images to generate probability distributions for identifying pixels as located in the direct radiation region, in the image region or in the projected collimator region, forming an image matrix consistent with the first gray scale values, the matrix including matrix values associated with the collimator region information, the body part information and the direct radiation information, determining a signal-to-noise ratio for individual ones of the matrix values, each ratio corresponding to an individual pixel, by taking into account values corresponding to a plurality of other pixels adjacent the individual pixel, determining gradient values among individual ones of the matrix values and associated with individual pixels by taking into account matrix values corresponding to a plurality of other pixels adjacent individual pixels, after training the neural network, feeding the determined signal-to-noise ratios and gradient values to input nodes of the neural network, determining with the trained neural network probabilities as to whether individual matrix values are associated with the direct radiation information or the body part information or the collimator region information, identifying with the trained neural network, and based on the probabilities, pixels corresponding to the direct radiation information or the collimator region information;

determining limit values for generating the second set of gray-scale values applicable to pixels other than those identified as corresponding to the direct radiation information or the collimator region information, automatically generating the second set of gray scale values in accord with the limit values and displaying a recording of the medical examination image in accord with the second set of gray scale values, based only on information associated with the image region and without influencing the second gray scale values as applied to the displayed recording with subjectively selected settings of a user.

2. The method according to claim 1, further comprising feeding matrix values to the input nodes of the neural network.

3. The method according to claim 1, further comprising feeding to the input nodes of the neural network an element chosen from the group consisting of an x-ray dose range used when generating the examination image and an x-ray voltage used when generating the examination image.

4. The method according to claim 1, further including assigning a probability value between 0 and 0.1 to the pixels corresponding to the collimator region information 0 and 0.1.

5. The method according to claim 1, further including assigning a probability value between 0.1 and 0.9 to the pixels corresponding to body part information.

6. The method according to claim 1, further including assigning a probability value between 0.9 and 1 to the pixels corresponding to direct radiation information.

7. The method according to claim 1, further comprising determining whether portions of the examination image are associated with the direct radiation information or the body part information or the collimator region information based on the probabilities.

8. The method according to claim 7, wherein the body part information is defined by a minimum number of pixels having similar image information.

* * * * *